Patented Oct. 14, 1952

2,614,097

UNITED STATES PATENT OFFICE 2,614,097

METALLO-THIOPLASTS

Lev Akobjanoff, St. Louis, Mo.

No Drawing. Application November 16, 1951,
Serial No. 256,841

13 Claims. (Cl. 260—79.1)

This invention relates to a new composition of matter resulting from the reaction of a difunctional organic compound and a chalcogen containing compounds having a non reactive metallic nucleus to which the chalcogen atoms are attached either by a single or a double bond.

These new compositions of matter represent a new type of high molecular weight polymers which polymers may be referred to as metallo-thioplastics. The known polysulfide plastics containing the repeating unit

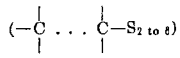

possess various disadvantages becoming, for instance, porous on heating, and yielding a disagreeable and toxic odor. The metallothioplastics (or metallothioplasts) of the present invention possess the desirable properties of the polysulfide plastics together with other advantages and without the disadvantages just mentioned.

The metallo-thioplastics contain the repeating unit

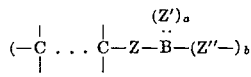

where

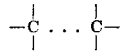

represents structure selected from the groups containing two carbon atoms connected by a valence bond and two carbon atoms separated by and joined to intervening structure, and where

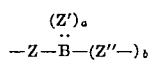

represents the residue of the chalcogen containing compound, in which Z, Z′, and Z″ are chalcogens and B is a non-reactive nucleus chosen among the metals: Hg, Mo, Sb, Sn, V, W, Zn, known to be the only ones able of forming thio-(seleno-, telluro-) acids salts of which dissolve in water without being hydrolized; and wherein $a$ is 0 and $b$ is 1 when the valence of B is 2, $a$ is 0 and $b$ is 2 when the valence of B is 3, $a$ is 1 and $b$ is 1 when the valence of B is 4, $a$ is 1 and $b$ is 2 when the valence of B is 5, $a$ is 2 and $b$ is 1 when the valence of B is 6.

The chalcogen containing compound which may be reacted with a difunctional organic compound may be exemplified by the following formulas:

1. MZ—B—Z′M (valence of B is 2)
2. 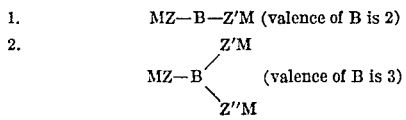

3. MZ—B—Z″M (valence of B is 4), with Z′ above B
4. 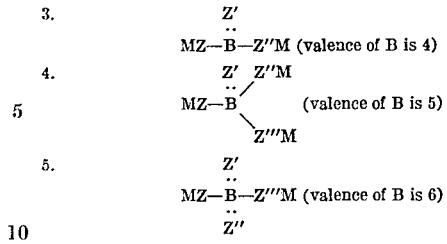
5. MZ—B—Z‴M (valence of B is 6), with Z′ above and Z″ below in which M is a member of the group consisting of alkali and alkaline earth metals, ammonia and amines, specific members include sodium, potassium, lithium, caesium, etc., ammonia, ethanolamines, etc. The preferred substituent is sodium.

The difunctional organic compound may be exemplified as follows:

in which X and X′ are any substituents which can be split off by treatment with the alkaline substance M, specific members including halogen, acid sulphate, nitrate, acid phosphate, bicarbonate, formate, acetate, propionate, laurate, oleate, stearate, oxalate, acid malonate, acid tartrate, acid citrate, etc. Thus an organic compound having at least two carbon atoms and a substituent attached to each of the carbon atoms, which substituent is split off during the reactions which occur when said compound is treated with a chalcogen compound from the group defined above, may be used in producing the plastics of this invention.

The intervening structure between the two carbon atoms may be the following:

1. Saturated straight chain hydrocarbons.
2. Saturated branched chain hydrocarbons.
3. Aromatic structure
4. Unsaturated hydrocarbon structure.
5. Ether linkages (including acetals, thioethers, etc.).

Members of the ether group include:

$ClCH_2CH_2OCH_2CH_2Cl$, $CH_3CHClOCHClCH_3$
$ClCH_2OCH_2Cl$, $ClC_2H_4OC_2H_4OC_2H_4Cl$
$ClCH_2OCH_2C(CH_3)_2CH_2OCH_2Cl$
$ClCH_2CH_2OCH_2OCH_2CH_2CH_2Cl$
$ClCH_2CH_2OCH_2OCH_2CH_2Cl$
$ClCH_2CH_2OC_6H_4OCH_2CH_2Cl$
$ClCH_2OCH_2CH_2OCH_2Cl$, $ClC_6H_4OC_6H_4Cl$ $ClC_6H_4OCH_2Cl$, $ClC_6H_4CH_2OCH_2C_6H_4Cl$, and other difunctional ethers. Members of the unsaturated group include: 1,4-dichlorobutene 2;

$ClCH_2CH=CHC_6H_4CH_2Cl$
$ClCH_2CH:CHCH_2CH_2Cl$; $ClCH_2CH:CH(CH_2)_3Cl$;

1,7-dichloroheptene 3; 1,6-dichloroheptene 3; 1,4-dichloropentene; 1,6-dichlorohexene 3; and other difunctional unsaturated carbon compounds.

Members of the saturated straight chain group include: dichloroethane, dichloropropane, dichlorobutane and other compounds having the general formula $X(CH_2)_nX'$ where $n$ has a value greater than 2. Members of the aromatic or aryl group include: $ClCH_2C_6H_4CH_2Cl$; orthodichlorobenzene; dichloroorthoxylene; p,p'-dichlorodiethylbenzene; α,α' dichloronaphthalene; β,β'dichloronaphthalene; 1,3 dichloromesitylene and other difunctional aryl compounds. Members of the saturated branched chain group include:

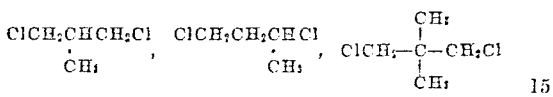

and other difunctional saturated branched chain compounds.

The reaction of dichloroethylene and sodium polysulfide has been known since 1840 when Loewig and Weidemann performed their experiments. Since then many polysulfide plastics have been synthetized as shown by the patents to Joseph C. Patrick and others but all of these plastics are polysulfides and possess the disadvantages shown above. None of these plastics prior to the present invention were formulated in such a way as to include as non-reactive nucleus elements from groups of the periodic table other than the sulfur family. Thus sulfur groups such as:

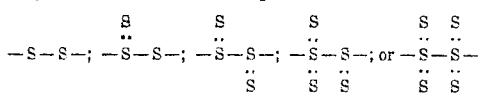

are known to exist in the repeating units of the polysulfide plastics of today and are the cause of the disagreeable odors possessed by these plastics. It has now been discovered that the presence of a non-reactive non-sulfur nucleus in these sulfur groups stabilizes the polysulfides against loss of volatile fragments containing sulfur, as shown by the odorless property of these new plastics. Also these new plastics do not have the tendency to blister or become porous when being processed as by molding.

In my copending U. S. patent application Serial No. 63,620, filed December 4, 1948, which became U. S. Patent No. 2,587,805 of March 4, 1952, the use of the element As as such a non-reactive nucleus is shown. As described below, other elements: Hg, Mo, Sb, Sn, V, W, Zn, are apt to function in the same way. Contrary to arsenic these seven elements are metals; they form a natural group being the only ones known to give thio-(seleno-, telluro-) acids, water-soluble salts of which are not hydrolized, the stability of these salts being an essential condition for their use in condensations to metallo-thioplastics.

The actual atomic grouping of B will depend upon the valence of the metal being used and the conditions of reaction employed in producing the chalcogen containing compound. For example, when sodium sulfide is reacted with zinc sulfide a compound having the following structural formula is produced: Na—S—Zn—S—Na which corresponds to the general formula

MZ—B—Z'M (number 1 above) in which B is the element zinc, M is sodium, Z and Z' is sulfur. In order to produce a chalcogen compound corresponding to the formula

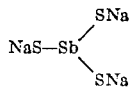

(number 2 above) sodium sulfide and antimonious sulfide ($Sb_2S_3$) are reacted together to produce the compound

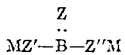

A compound corresponding to the formula $$MZ'—\overset{Z}{B}—Z''M$$

(number 3 above) is prepared by reaction of sodium sulfide with tin disulfide ($SnS_2$) to yield the substance

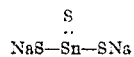

A compound corresponding to the formula

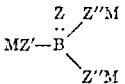

(number 4 above) is prepared by reaction of sodium disulfide with vanadium pentasulfide ($V_2S_5$) to give

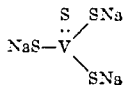

A compound corresponding to the formula

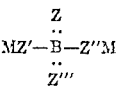

(number 5 above) is prepared by reacting sodium sulfide with ammonium molybdate $(NH_4)_6Mo_7O_{24}$ to produce the compound

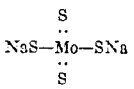

Thus it may be seen that in the production of the plastics of this invention the chalcogen atoms are bound together chemically by the non-reactive metallic nucleus B. Compounds have been produced in which B has the value:

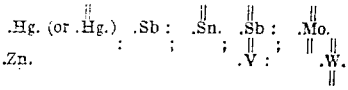

Some of the salts of the above metals represented by B are prepared as follows:

1. $HgS + Na_2S \rightarrow Hg(SNa)_2$ or
   $HgS + 2Na_2S \rightarrow HgS.(Na_2S)_2$
2. $MoS_3 + Na_2S \rightarrow Mo(S)_2(SNa)_2$
3. $Sb_2S_5 + 3Na_2S \rightarrow 2Sb(S)(SNa)_3$
4. $SnS_2 + Na_2S \rightarrow Sn(S)(SNa)_2$
5. $V_2S_5 + 3Na_2S \rightarrow 2V(S)(SNa)_3$
6. $WS_3 + Na_2S \rightarrow W(S)_2(SNa)_2$
7. $ZnS + Na_2S \rightarrow Zn(SNa)_2$ Another important characteristic of these salts is their ability to readily react with difunctional organic compounds. The reaction of these salts with the organic compounds is carried out in a solvent medium where the compounds are mutually soluble. For work in aqueous medium, the organic substances may be emulsified or in a molten state. For example, the solutions may correspond to the use of a ⅕ gram molecular weight. The organic compound such as dichloroethylene may be added in a slight molecular excess and the mixture may be heated progressively.

The sulfomercuriates, molybdates, vanadates, tungstates and zincates react with the organic compound

readily at room temperature, and more quickly (30 minutes to 1 hour) when the mixture is boiled. A thick precipitate forms as the reaction takes place. The sulfoantimonates react energetically, for example, with dichloroethylene. The polymers formed are of a yellowish-white color. The reaction of the sulfostannates is complete, for example, after heating for some 15 hours at 120° C. if treated under pressure. The products of reaction can be filtered, washed with water and dried in air.

Compounds of the type —Z—B—Z— and

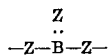

such as —S—Zn—S— and

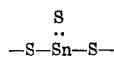

are thermoplastic, softening at temperatures of 150° C. to 180° C.; for the type

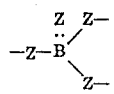

containing Sb thermoplasticity at about 100° C. is observed, also brownish discoloration of the originally yellowish-white plastic; Hg containing metallo-thioplasts soften only slightly on heating as high as 240°–250° C. The softening point of presently known polysulfide plastics is 75° C.

The solubility of these products in organic solvents depends on the organic material used in their preparation.

The following examples illustrate the manner of making the

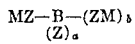

compounds and the conditions under which these compounds are reacted with the difunctional organic compounds

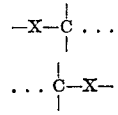

to produce the plastics of this invention. All parts are in weight unless otherwise indicated.

*Example 1*

A compound containing the nucleus —Hg— was prepared by reacting 15 parts of mercuric sulfide (HgS) with 7.8 parts of sodium sulfide in 35 parts by volume of water. A colorless solution containing the compound sodium sulfomercuriate was formed (NaS$_2$)Hg. A modified plastic having the general formula (—SHgSR—)$_y$ was prepared by reacting 19.5 parts of sodium sulfomercuriate with 10 parts of ethylene dichloride and 30 parts of water at a temperature of 20° C. for ½ hour and then at a temperature of 84° C. for 1 hour. The resulting resin was a white powder, substantially odorless, sublimated at a temperature above 240° C., soluble in acetone, benzene, and carbon disulfide, and insoluble in naphtha.

*Example 2*

A compound containing the nucleus —Zn— was prepared by reacting 12 parts of zinc sulfide ZnS with 7.8 parts of sodium sulfide in 50 parts of water. A viscous colorless solution was formed containing the compound sodium sulfozincate (NaS)$_2$Zn. A modified plastic having the general formula (—SZnSR—)$_y$ was prepared by reacting 17.5 parts of (NaS)$_2$Zn with 10 parts of ethylene dichloride and 45 parts of water at 25° C. for ½ hour and then at 84° C. for 1 hour. The resulting resin was white, odorless, melted at 184° C., soluble in acetone, benzene and naphtha, insoluble in carbon disulfide.

A further reaction was carried out in which 15 parts of O(C$_2$H$_4$)$_2$Cl$_2$ was reacted with 17.5 parts of (NaS)$_2$Zn and 45 parts of water at 84° C. for 6 hours. The resulting material was a yellowish oil of medium viscosity, odorless at room temperature and having a very weak aromatic odor when warmed; soluble in benzene, acetone, diethylether and insoluble in CS$_2$ and naphtha.

*Example 3*

A compound containing the nucleus —Zn— was prepared by reacting 20 parts of ZnS with 14 parts of KOH dissolved in 30 parts of water, the resulting filtered solution contained a compound having the composition potassium sulfoxyzincate Zn(SK)(OK). A composition having the general formula HOZnSR was prepared by reacting 19 parts of KOZnSK with 10 parts of ethylene dichloride and 30 parts of water at 84° C. for 8 hours. The resulting material was a white dry powder which carbonized at a temperature of 240° C.; very slightly soluble in CS$_2$, naphtha, and acetone, and insoluble in benzene.

*Example 4*

A compound having the nucleus —Sn(S)— was prepared by reacting a mixture of 7.8 parts of Na$_2$S and 18 parts of SnS$_2$, for which purpose both salts were molten together. SnS$_2$ has been prepared by reacting a stannic salt in aqueous solution with H$_2$S and extracting the resulting mixture with acetone to eliminate the free sulfur. The resulting compound was Na sulfostannate Na$_2$SnS$_3$. A modified plastic having the general formula (—SSn(S)SR—)$_y$ was prepared by reacting 52.2 parts of Na$_2$SnS$_3$ with 20 parts of ethylene dichloride and 180 parts of water at 120° C. for 15 hours. The resulting resin was elastic and workable on a rubber mill, thermoplastic at approximately 170° C., soluble in carbon disulfide and insoluble in benzene.

*Example 5*

A compound containing the nucleus

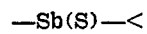

was prepared by reacting 7.8 parts of Na$_2$S with 41 parts of Sb$_2$S$_5$. The resulting product was sodium sulfoantimonate Na$_3$SbS$_4$. A modified plastic having the general formula

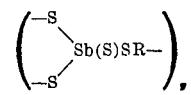

was prepared by reacting 64 parts of Na$_3$SbS$_4$ with 30 parts of ethylene dichloride in the presence of 180 parts of water at 84° C. The reaction was completed very rapidly. The resulting product was yellow at first and turning brown in color; workable on the rubber mill, thermoplastic at 100° C., soluble in carbon disulfide and insoluble in benzene.

*Example 6*

A compound containing the nucleus —V(S)—< was prepared by reacting 7.8 parts of Na₂S in 25 parts of water with 12 parts of NH₄VO₃ in 450 parts of water. The resulting product was sodium sulfovanadate Na₃VS₄. A modified or metallo-thioplastic having the general formula

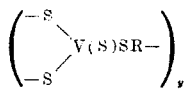

was prepared by reacting 49 parts of Na₃VS₄ with 30 parts of ethylene dichloride in 900 parts of water at 84° C. for 15 minutes. The resulting product was white, slightly sticky, substantially odorless, melting at 141° C., soluble in benzene, naphtha, carbon disulfide, acetone.

*Example 7*

A compound containing the nucleus

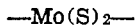

was prepared by reacting 31.2 parts of Na₂S in 50 parts of water with 15 parts of (NH₄)₆Mo₇O₂₄ in 100 parts of water. The resulting product was sodium sulfomolybdate Na₂MoS₄. A metallo-thioplastic having the general formula

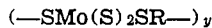

was prepared by reacting 45 parts of Na₂MoS₄ and 20 parts of ethylene dichloride and 300 parts of water at 84° C. for 30 minutes. The resulting product was white odorless, melting at 178° C., soluble in CS₂, naphtha, benzene, insoluble in acetone.

*Example 8*

A compound containing the nucleus —W(S)₂— was prepared by reacting 31.2 parts of Na₂S in 20 parts of water with 30 parts of Na₂WO₄ in 100 parts of water. The resulting product was sodium sulfotungstate Na₂WS₄. A modified plastic having the general formula

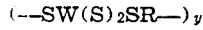

was prepared by reacting 62.5 parts of Na₂WS₄ with 20 parts of ethylene dichloride in the presence of 240 parts of water at 84° C. for 30 minutes. The resulting product was white, odorless, melting at 130° C., soluble in benzene, CS₂, and acetone, insoluble in naphtha.

A further reaction was carried out in which 30 parts of O(C₂H₄Cl)₂ was reacted with 62.5 parts of Na₂WS₄ in the presence of 240 parts of water at 84° C. for 24 hours. The resulting oily product was colorless, odorless, and soluble in benzene, acetone, and carbon disulfide.

The above reaction can also be carried out with monofunctional organic compounds. The obtained products are monomeric esters of the chalcoacids

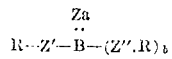

The metallo-thioplasts obtained by the various processes described are processed in a manner similar to that used in the treatment of ordinary polysulfides. In particular treated by the proceedings established for rubber and other plastics. The compounding of the modified metallo-thioplastics may follow the same lines as the compounding of ordinary polysulfides.

Particularly interesting is the treatment with sulfur. Sulfur sublimes even more readily than the ordinary polysulfides but as far as odor is concerned, the effect of sulfur vapors is practically non-existent, contrary to known polysulfides especially those having the formula —C₂H₄.S₄—, which produce a violent physiological reaction. It has been found in the course of this work that mixtures of polysulfides with sulfur are plasticized by simple heating to temperatures ranging from 80° C. to 150° C. Modified polysulfides and particularly the metallo-thioplastics show this effect to the same extent as the others. Products so prepared are similar to "vulcanized" polysulfides by all their essential criteria. In principle there is no limit to the quantities of sulfur that may be added but sulfur in amounts of 300% and more requires the addition of stabilizing substances in order to avoid ageing.

Another interesting effect is obtained by blending modified polysulfides and particularly metallo-thioplastics with ordinary polysulfides. The resulting blend is less volatile than the ordinary polysulfide.

This application is a continuation in part of my application Serial No. 63,620 of December 4, 1948.

While certain representative embodiments and details have been shown for the purpose of illustrating the invention, it will be apparent to those skilled in the art that various changes and modifications may be made therein without departing from the spirit or the scope of the invention.

I claim:

1. A polymeric substance having the repeating unit

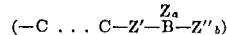

in which —C . . . C— represents structure selected from the group consisting of two adjacent carbon atoms connected by a valence bond and two carbon atoms separated by and joined to intervening structure; Z, Z' and Z" are chalcogens of atomic number greater than 8; B is a non-reactive nucleus chosen from the group of metals consisting of: Hg, Mo, Sb, Sn, V, W, Zn; and wherein $a$ is 0 and $b$ is 1 when the valence of B is 2, $a$ is 0 and $b$ is 2 when the valence of B is 3, $a$ is 1 and $b$ is 1 when the valence of B is 4, $a$ is 1 and $b$ is 2 when the valence of B is 5, $a$ is 2 and $b$ is 1 when the valence of B is 6.

2. A polymeric substance having the repeating unit

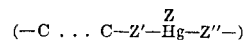

in which —C . . . C— represents structure selected from the group consisting of two adjacent carbon atoms connected by a valence bond and two carbon atoms separated by and joined by intervening structure; and wherein Z, Z' and Z" are chalcogens of atomis number greater than 8.

3. A polymeric substance having the repeating unit

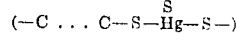

in which —C . . . C— represents structure selected from the group consisting of two adjacent carbon atoms connected by a valence bond and two carbon atoms separated by and joined to intervening structure.

4. A polymeric substance having the repeating unit $$(-C \ldots C-Z'-\underset{Z''}{\overset{Z}{Mo}}-Z'''-)$$

in which —C . . . C— represents structure selected from the group consisting of two adjacent carbon atoms connected by a valence bond and two carbon atoms separated by and joined to intervening structure; and wherein Z, Z', Z'' and Z''' are chalcogens of atomic number greater than 8.

5. A polymeric substance having the repeating unit $$(-C \ldots C-S-\underset{S}{\overset{S}{Mo}}-S-)$$

in which —C . . . C— represents structure selected from the group consisting of two adjacent carbon atoms connected by a valence bond and two carbon atoms separated by and joined to intervening structure.

6. A polymeric substance having the repeating unit (—C . . . C—Z—Sb:(Z'—)$_2$) in which —C . . . C— represents structure selected from the group consisting of two adjacent carbon atoms connected by a valence bond and two carbon atoms separated by and joined to intervening structure; and wherein Z and Z' are chalcogens of atomic number greater than 8.

7. A polymeric substance having the repeating unit (—C . . . C—S—Sb:(S—)$_2$) in which —C . . . C— represents structure selected from the group consisting of two adjacent carbon atoms connected by a valence bond and two carbon atoms separated by and joined to intervening structure.

8. A polymeric substance having the repeating unit $$(-C \ldots C-Z'-\overset{Z}{Sb}:(Z''-)_2)$$

in which —C . . . C— represents structure selected from the group consisting of two adjacent carbon atoms connected by a valence bond and two carbon atoms separated by and joined to intervening structure, and wherein Z, Z' and Z'' are chalcogens of atomic number greater than 8.

9. A polymeric substance having the repeating unit $$(-C \ldots C-S-\overset{S}{Sb}:(S-)_2)$$

in which —C . . . C— represents structure selected from the group consisting of two adjacent carbon atoms connected by a valence bond and two carbon atoms separated by and joined to intervening structure.

10. A polymeric substance having the repeating unit $$(-C \ldots C-Z'-\overset{Z}{Sn}-Z''-)$$

in which —C . . . C— represents structure selected from the group consisting of two adjacent carbon atoms connected by a valence bond and two carbon atoms separated by and joined to intervening structure; and wherein Z, Z' and Z'' are chalcogens of atomic number greater than 8.

11. A polymeric substance having the repeating unit $$(-C \ldots C-S-\overset{S}{Sn}-S-)$$

in which —C . . . C— represents structure selected from the group consisting of two adjacent carbon atoms connected by a valence bond and two carbon atoms separated by and joined to intervening structure.

12. A polymeric substance having the repeating unit (—C . . . C—Z—Zn—Z'—) in which —C . . . C— represents structure selected from the group consisting of two adjacent carbon atoms connected by a valence bond and two carbon atoms separated by and joined to intervening structure; and wherein Z and Z' are chalcogens of atomic number greater than 8.

13. A polymeric substance having the repeating unit (—C . . . C—S—Zn—S—) in which —C . . . C— represents structure selected from the group consisting of two adjacent carbon atoms connected by a valence bond and two carbon atoms separated by and joined to intervening structure.

LEV AKOBJANOFF.

No references cited.